United States Patent
Suzuki et al.

(10) Patent No.: US 11,280,666 B2
(45) Date of Patent: Mar. 22, 2022

(54) DIAGNOSIS SYSTEM

(71) Applicant: SUMITOMO HEAVY INDUSTRIES, LTD., Tokyo (JP)

(72) Inventors: Kota Suzuki, Aichi (JP); Mikio Komatsu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 199 days.

(21) Appl. No.: 16/744,819

(22) Filed: Jan. 16, 2020

(65) Prior Publication Data

US 2020/0249073 A1 Aug. 6, 2020

(30) Foreign Application Priority Data

Jan. 31, 2019 (JP) .............................. JP2019-016189

(51) Int. Cl.
| | |
|---|---|
| *G01H 1/00* | (2006.01) |
| *G01H 17/00* | (2006.01) |
| *G01M 15/12* | (2006.01) |
| *G01M 13/028* | (2019.01) |
| *G01M 7/02* | (2006.01) |
| *G05B 23/02* | (2006.01) |

(52) U.S. Cl.
CPC .............. *G01H 1/003* (2013.01); *G01H 17/00* (2013.01); *G01M 7/02* (2013.01); *G01M 13/028* (2013.01); *G01M 15/12* (2013.01); *G05B 23/02* (2013.01); *G05B 23/0227* (2013.01)

(58) Field of Classification Search
CPC ......... G01H 1/003; G01H 17/00; G01M 7/02; G01M 13/028; G01M 15/12; G05B 23/02; G05B 23/0227

USPC .......................................................... 73/660
See application file for complete search history.

(56) References Cited

U.S. PATENT DOCUMENTS

| | | | |
|---|---|---|---|
| 2010/0161778 A1* | 6/2010 | Guinard | ................ G06F 9/5027 709/222 |
| 2014/0049285 A1 | 2/2014 | Rodriguez | |
| 2017/0102295 A1 | 4/2017 | Komatsu et al. | |
| 2017/0356945 A1 | 12/2017 | Lee | |

(Continued)

FOREIGN PATENT DOCUMENTS

| | | |
|---|---|---|
| CN | 103620354 A | 3/2014 |
| CN | 107505540 A | 12/2017 |

(Continued)

OTHER PUBLICATIONS

Office Action issued in Chinese Application No. 202010031446.6, dated Jul. 22, 2021.

*Primary Examiner* — Lisa M Caputo
*Assistant Examiner* — Rose M Miller
(74) *Attorney, Agent, or Firm* — Michael Best & Friedrich LLP (57) ABSTRACT

A diagnosis system includes a sensor that is provided in a diagnosis target device and detects diagnosis target information on the diagnosis target device, and a diagnosis processing unit that executes diagnosis processing of the diagnosis target device based on the diagnosis target information detected by the sensor. The diagnosis processing unit specifies a section of diagnosis target information suitable for the diagnosis processing based on section specifying information, and executes the diagnosis processing based on the diagnosis target information in the specified section.

19 Claims, 6 Drawing Sheets

(56) References Cited

U.S. PATENT DOCUMENTS

| | | | | |
|---|---|---|---|---|
| 2019/0171187 A1* | 6/2019 | Cella | ...................... | G06N 20/00 |
| 2019/0190978 A1* | 6/2019 | Brown | .................. | B65G 43/06 |
| 2019/0324444 A1* | 10/2019 | Cella | .................. | G06N 3/0454 |
| 2019/0339120 A1 | 11/2019 | Yokota et al. | | |
| 2019/0339688 A1* | 11/2019 | Cella | ................ | G05B 19/41865 |
| 2020/0103894 A1* | 4/2020 | Cella | ................. | G05B 23/0289 |

FOREIGN PATENT DOCUMENTS

| | | | |
|---|---|---|---|
| CN | 108983311 A | | 12/2018 |
| JP | 2017-075795 A | | 4/2017 |
| TW | 201833698 A | | 9/2018 |
| WO | 2018/200204 A1 | | 11/2018 |

\* cited by examiner

DIAGNOSIS SYSTEM

RELATED APPLICATIONS

The content of Japanese Patent Application No. 2019-016189, on the basis of which priority benefits are claimed in an accompanying application data sheet, is in its entirety incorporated herein by reference.

BACKGROUND

Technical Field

Certain embodiments of the present invention relate to a diagnosis system.

Description of Related Art

For example, there is a known diagnosis system for diagnosing a device (diagnosis target device) such as a motor or a gear motor. A diagnosis system generally includes a sensor disposed in a diagnosis target device and a diagnosis unit that diagnoses the diagnosis target device based on information from the sensor. In the related art, a diagnosis system as described in the related art is proposed, for example.

SUMMARY

It is desirable to provide a diagnosis system capable of performing diagnosis processing such as abnormality diagnosis and lifetime diagnosis more accurately.

According to an embodiment of the present invention, there is provided a diagnosis system including a sensor that is provided in a diagnosis target device and detects diagnosis target information on the diagnosis target device, and a diagnosis processing unit that executes diagnosis processing of the diagnosis target device based on the diagnosis target information detected by the sensor. The diagnosis processing unit specifies a section of diagnosis target information suitable for the diagnosis processing based on section specifying information and executes the diagnosis processing based on the diagnosis target information in the specified section.

Any combination of the above constituent elements and those obtained by replacing the constituent elements and expressions of the invention with each other among methods, devices, systems, and the like are also effective as an aspect of the invention.

According to the invention, it is possible to provide the diagnosis system capable of executing the diagnosis processing more accurately.

DETAILED DESCRIPTION

Hereinafter, the invention will be described below based on preferred embodiments with reference to drawings. The embodiments do not limit the invention, but are examples. All features and combinations described in the embodiments are not necessarily essential to the invention. The same reference numeral is assigned to the same or equivalent component, member, and processing shown in each drawing, and repeated descriptions are omitted as appropriate.

Figure 1:
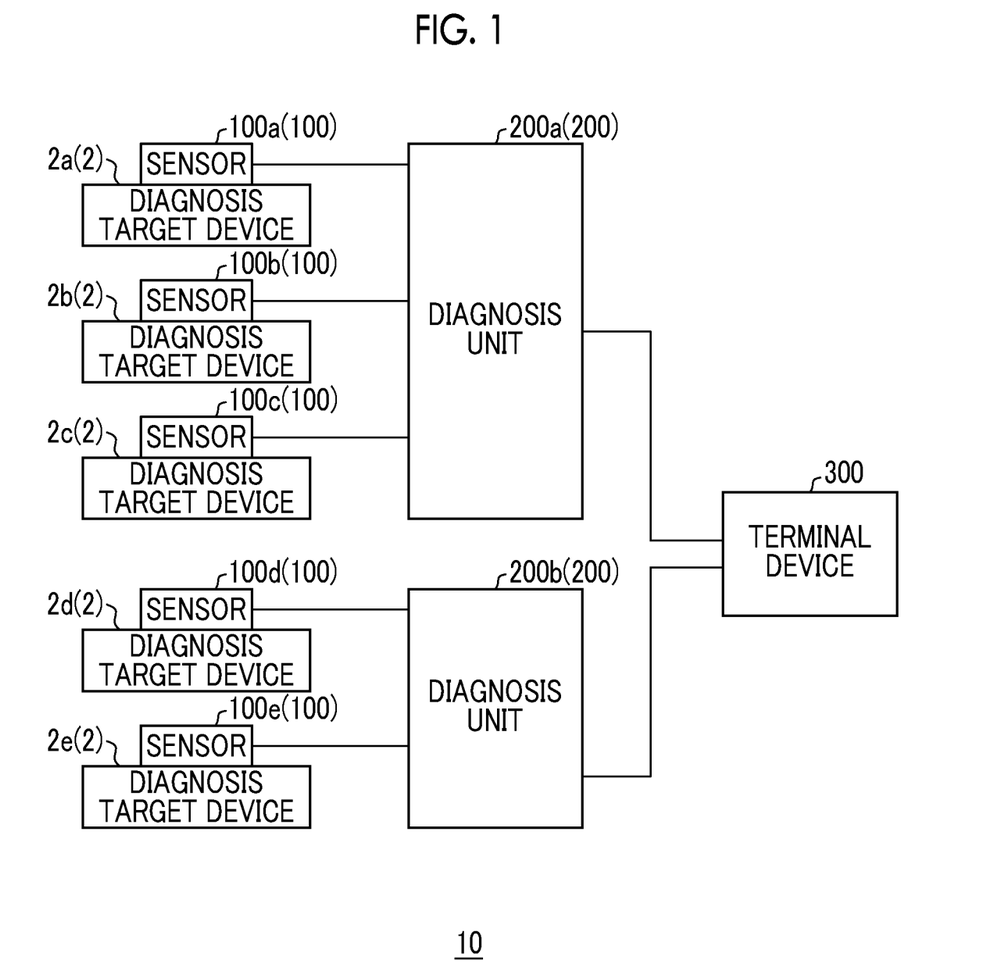
FIG. 1 is a schematic diagram showing a configuration of a diagnosis system according to an embodiment.

FIG. 1 is a schematic diagram showing a configuration of a diagnosis system 10 according to the embodiment. The diagnosis system 10 performs diagnosis processing for diagnosing diagnosis target devices 2a to 2e collectively referred to as a diagnosis target device 2, specifically, abnormality diagnosis processing for diagnosing whether or not an abnormality occurs in the diagnosis target device 2. In the embodiment, a case where the diagnosis target device 2 is a rotation device (for example, a motor alone or a gear motor) provided with a motor will be described. The diagnosis target device 2 may be another device such as an engine, an injection molding machine, a machine tool, an industrial robot.

The diagnosis system 10 includes sensors 100a to 100e collectively referred to as a sensor 100, diagnosis units 200a and 200b collectively referred to as a diagnosis unit 200, and a terminal device 300 which is an information processing terminal operated by a user. The sensor 100 is connected to the diagnosis unit 200 by wire. The diagnosis unit 200 is connected to the terminal device 300 by wire or wirelessly.

The sensors 100a to 100e are respectively attached to the diagnosis target devices 2a to 2e. The sensor 100 is a vibration sensor in the embodiment, detects a vibration generated in the corresponding diagnosis target device 2 (that is, the sensor 100 is attached) to generate vibration information (diagnosis target information) indicating magnitude of the vibration, and transmits the vibration information to the diagnosis unit 200. In FIG. 1, only one sensor 100 is attached to each diagnosis target device 2. However, a necessary number of sensors 100 for the abnormality diagnosis processing of each diagnosis target device 2 are actually installed at necessary positions.

The diagnosis unit 200 repeatedly executes the abnormality diagnosis processing of the corresponding diagnosis target device 2 based on the vibration information transmitted from each sensor 100. The diagnosis unit 200 transmits a diagnosis result to the terminal device 300. In FIG. 1, three sensors 100 are connected to the diagnosis unit 200a, and two sensors 100 are connected to the diagnosis unit 200b. However, the number of sensors 100 connected to each diagnosis unit 200 is not particularly limited as long as the number of sensors 100 is within a range of the number of sensor connection channels of each diagnosis unit 200.

The terminal device 300 displays various setting screens for inputting setting information related to the abnormality diagnosis processing (hereinafter referred to as diagnosis setting information) on a predetermined display. The terminal device 300 acquires the diagnosis setting information input on the various setting screens and transmits the diagnosis setting information to the diagnosis unit 200. In addition, the terminal device 300 displays the diagnosis result transmitted by the diagnosis unit 200 on the display. The user can know whether or not the abnormality occurs in the diagnosis target device 2 by checking the diagnosis result transmitted to the terminal device 300.

By the way, in the diagnosis processing, it is possible to perform the diagnosis more accurately by using only vibration information of a section suitable for the diagnosis than using all of the acquired vibration information. For example, vibration information in a section in which a load variation on the diagnosis target device 2 is small is suitable. This is because a variation of the vibration information is small when there is no abnormality in the diagnosis target device 2 in the section in which the load variation is small and it is easy to detect the variation of the vibration information in a case where the abnormality occurs in the diagnosis target device 2.

Figure 2:
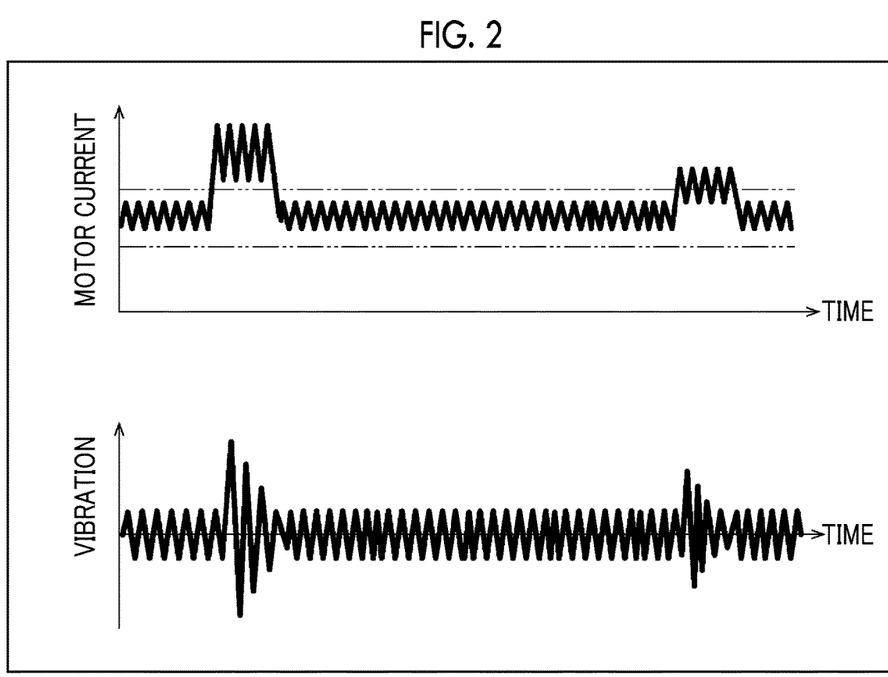
FIG. 2 is a diagram for describing a relationship between a motor current value supplied to a motor included in a diagnosis target device and vibration information generated in the diagnosis target device.

Here, as shown in FIG. 2, vibration variation (amplitude) generated in the diagnosis target device 2 is small when a motor current value supplied to the motor included in the diagnosis target device 2 is within a predetermined current value range (that is, when the load variation is small), and vibration variation (amplitude) generated in the diagnosis target device 2 is large when the motor current value exceeds the range. A similar relationship is established between a motor rotating speed of the motor included in the diagnosis target device 2 and the vibration generated in the diagnosis target device 2. Therefore, the section of the diagnosis target information suitable for the diagnosis described above may be specified based on the motor current value or the motor rotating speed. In the embodiment, the section of the vibration information suitable for the diagnosis is specified based on at least one of the motor current value and the motor rotating speed to diagnose the diagnosis target device 2 based on the vibration information in the specified section. Hereinafter, the information for specifying the section of the vibration information suitable for the diagnosis, such as the motor current value and the motor rotating speed, will be referred to as "section specifying information".

Figure 3:
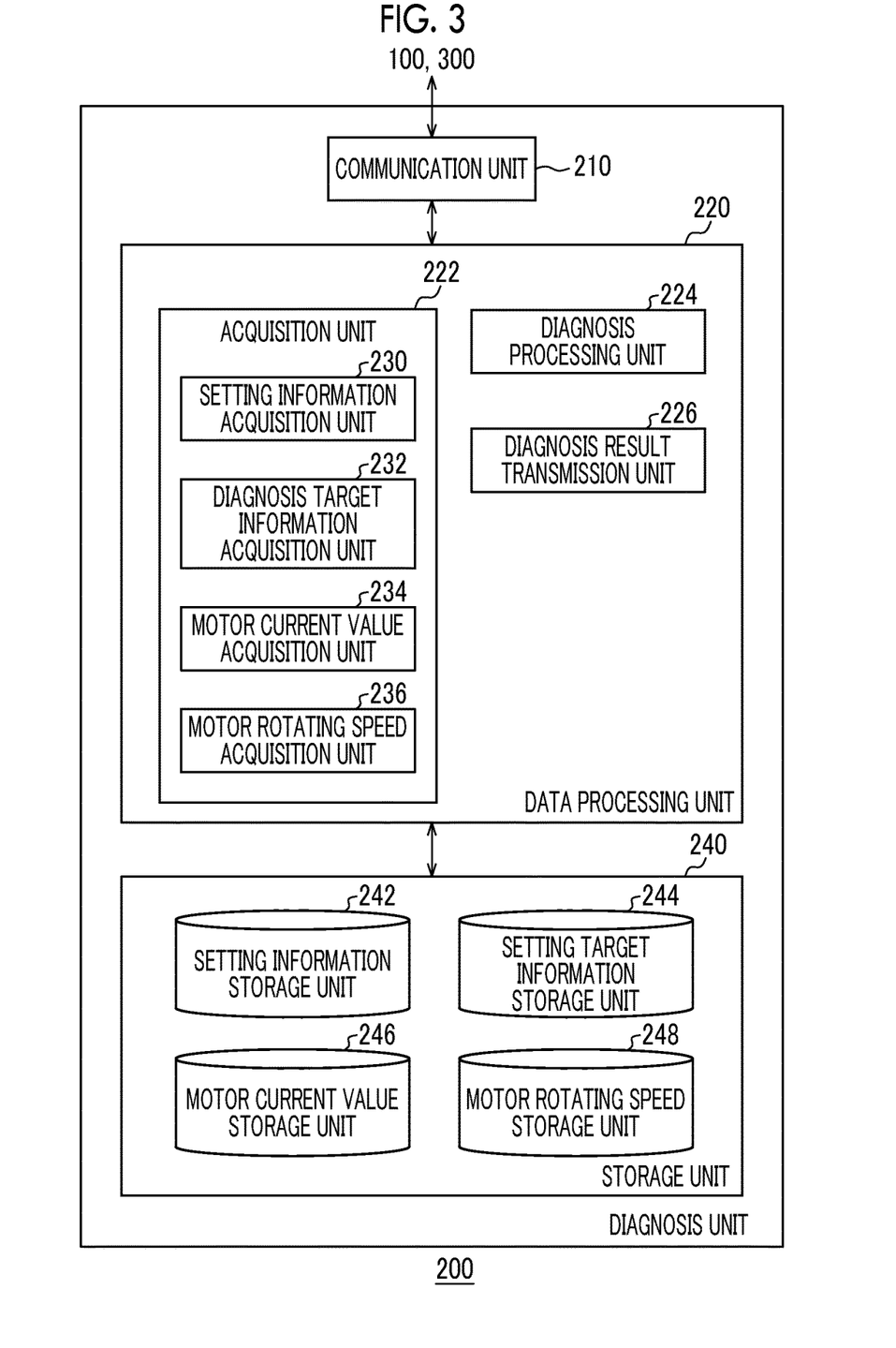
FIG. 3 is a block diagram showing a function and configuration of a diagnosis unit in FIG. 1.

FIG. 3 is a block diagram showing a function and configuration of the diagnosis unit 200. Each block shown in FIG. 3 can be realized by an element or a mechanical device including a computer CPU and memory in hardware and by a computer program or the like in software. Here, functional blocks realized by cooperation of the hardware and the software are illustrated. Therefore, those skilled in the art will understand that these functional blocks can be realized in various forms by a combination of the hardware and the software. The same applies to the subsequent block diagrams.

The diagnosis unit 200 includes a communication unit 210 that executes communication processing with the sensor 100 and the terminal device 300 in accordance with various communication protocols, a data processing unit 220 that executes the diagnosis processing, and a storage unit 240 that stores data to be referred and updated by the data processing unit 220.

The storage unit 240 includes a setting information storage unit 242, a diagnosis target information storage unit 244, a motor current value storage unit 246, and a motor rotating speed storage unit 248. The setting information storage unit 242 stores the diagnosis setting information transmitted from the terminal device 300. The diagnosis target information storage unit 244 stores the diagnosis target information acquired from the sensor 100 in association with a timepoint when the information is generated. The timepoint when the diagnosis unit 200 acquires the diagnosis target information from the sensor 100 may be a timepoint when the diagnosis target information is also generated. The motor current value storage unit 246 stores a current value supplied to the motor of the diagnosis target device 2 in association with a timepoint when the current is supplied to the motor. The motor rotating speed storage unit 248 stores a rotating speed of the motor of the diagnosis target device 2 in association with a timepoint when the rotating speed is realized.

The data processing unit 220 includes an acquisition unit 222, a diagnosis processing unit 224, and a diagnosis result transmission unit 226. The acquisition unit 222 includes a setting information acquisition unit 230, a diagnosis target information acquisition unit 232, a motor current value acquisition unit 234, and a motor rotating speed acquisition unit 236. The setting information acquisition unit 230 acquires various pieces of diagnosis setting information transmitted from the terminal device 300 and stores the information in the setting information storage unit 242. The diagnosis target information acquisition unit 232 acquires vibration information from each sensor 100 at a sampling frequency set in the diagnosis setting information. The diagnosis target information acquisition unit 232 stores the acquired vibration information in the diagnosis target information storage unit 244 in association with a timepoint when the information is generated.

The motor current value acquisition unit 234 acquires a motor current value at a predetermined cycle from a controller (not shown) that controls the motor of the diagnosis target device 2. The motor current value acquisition unit 234 stores the acquired motor current value in the motor current value storage unit 246 in association with a timepoint when the information is generated. The motor rotating speed acquisition unit 236 acquires a motor rotating speed at a predetermined cycle from the controller that controls the motor of the diagnosis target device 2. The motor rotating speed acquisition unit 236 stores the acquired motor rotating speed in the motor rotating speed storage unit 248 in association with a timepoint when the information is generated.

The diagnosis processing unit 224 repeatedly executes the diagnosis processing at a predetermined diagnosis processing interval.

First, the diagnosis processing unit 224 specifies the section of the vibration information suitable for the diagnosis (hereinafter also referred to as diagnosis section) from, for example, the pieces of vibration information (diagnosis target information) acquired after the previous diagnosis processing based on the section specifying information. In the embodiment, the diagnosis processing unit 224 specifies a section in which the variation of the vibration information is relatively small as the diagnosis section when the diagnosis target device 2 is normal. As described below in FIG. 5, anyone of "motor current value", "motor rotating speed", "motor current value and motor rotating speed" is set in the section specifying information through the terminal device 300.

When the motor current value is set in the section specifying information, the diagnosis processing unit 224 specifies a section in which a state where the motor current value is within a predetermined current value range continues for a predetermined time as the diagnosis section.

When the motor rotating speed is set in the section specifying information, the diagnosis processing unit 224 specifies a section in which a state where the motor rotating speed is within a predetermined rotating speed range continues for a predetermined time as the diagnosis section.

When the motor current value and the motor rotating speed are set in the section specifying information, the diagnosis processing unit 224 specifies a section in which a state where the motor current value is within a predetermined current value range and the motor rotating speed is within a predetermined rotating speed range continues for a predetermined time as the diagnosis section.

The diagnosis processing unit 224 may specify only one diagnosis section, for example, only the longest diagnosis section, or may specify a plurality of, for example, all diagnosis sections. When there is no section that matches a condition for the diagnosis section, the diagnosis processing unit 224 may not perform the diagnosis and transmit the fact that the diagnosis does not be performed to the terminal device 300, or may specify the longest section among the specified sections as the diagnosis section although the section does not match the condition of the diagnosis section.

It is desirable to specify the diagnosis section by the motor current value when the motor rotating speed of the diagnosis target device 2 is constant and the load on the motor varies. It is desirable to specify the diagnosis section by the motor rotating speed when the load on the motor of the diagnosis target device 2 is constant and the motor rotating speed varies.

Subsequently, the diagnosis processing unit 224 diagnoses whether or not the abnormality occurs in the corresponding diagnosis target device 2 based on the vibration information of the specified diagnosis section. In the embodiment, the diagnosis processing unit 224 uses a diagnosis method set in the diagnosis setting information among a peak value diagnosis, an effective value diagnosis, an FFT diagnosis, and an H-FFT diagnosis to diagnose whether or not the abnormality occurs in the corresponding diagnosis target device 2.

The peak value diagnosis is a diagnosis method for diagnosing that the abnormality occurs in a case where magnitude of a peak value of the vibration (distance between the maximum value and the minimum value of amplitude within the diagnosis section) indicated by the vibration information exceeds a predetermined threshold value.

The effective value diagnosis is a diagnosis method for diagnosing that the abnormality occurs in a case where magnitude of an effective value of the vibration (root mean square of vibration within the diagnosis section) indicated by the vibration information exceeds a predetermined threshold value.

The FFT diagnosis is a diagnosis method for diagnosing that the abnormality occurs in a case where a fast Fourier transform (FFT) is executed on a vibration waveform based on the vibration information and a value obtained by adding vibration components of a plurality of specific frequencies among vibration components of respective frequencies obtained as a result of the FFT exceeds a predetermined threshold value.

The H-FFT diagnosis is a diagnosis method for diagnosing that the abnormality occurs in a case where the FFT is executed on an envelope of the vibration waveform based on the vibration information and a value obtained by adding vibration components of a plurality of specific frequencies among vibration components of respective frequencies obtained as a result of the FFT exceeds a predetermined threshold value.

The diagnosis result transmission unit 228 transmits the diagnosis result from the diagnosis processing unit 224 to the terminal device 300 through the communication unit 210. The diagnosis result transmission unit 226 may transmit the diagnosis result only in a case where a diagnosis is made that the abnormality occurs.

Figure 4:
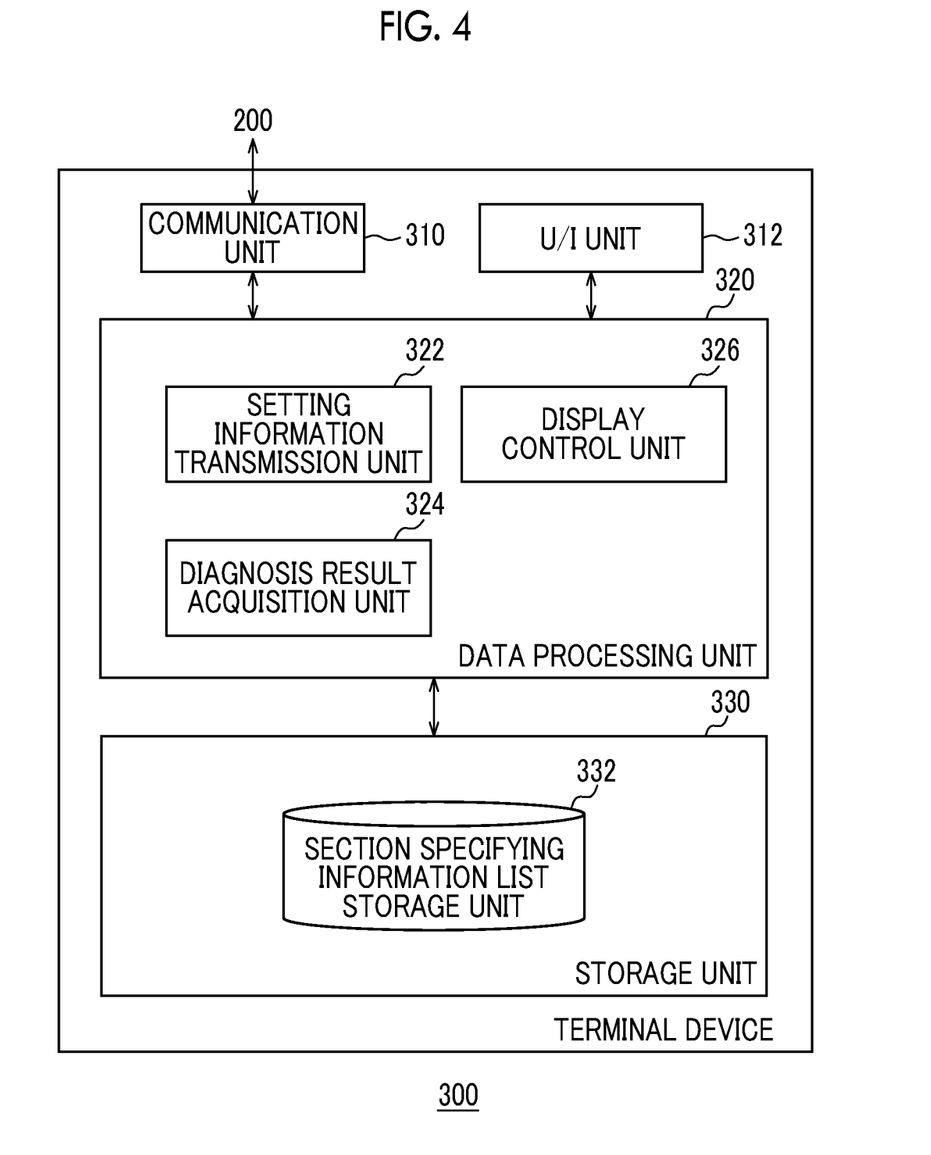
FIG. 4 is a block diagram showing a function and configuration of a terminal device in FIG. 1.

FIG. 4 is a block diagram showing a function and configuration of the terminal device 300. The terminal device 300 includes a communication unit 310 that executes the communication processing with the diagnosis unit 200 in accordance with the various communication protocols, a U/I unit 312 that receives an operation input by a user and displays various screens in response to an instruction from the data processing unit 320 on the display, a data processing unit 320 that executes various pieces of data processing based on data acquired from the communication unit 310 and the U/I unit 312, and a storage unit 330 that stores data to be referred and updated by the data processing unit 320.

The storage unit 330 includes a section specifying information list storage unit 332. The section specifying information list storage unit 332 stores a list of section specifying information. In the embodiment, the section specifying information list storage unit 332 stores the motor current value and the motor rotating speed as the section specifying information.

The data processing unit 320 includes a setting information transmission unit 322, a diagnosis result acquisition unit 324, and a display control unit 326. The setting information transmission unit 322 transmits information input on the various setting screens to the diagnosis unit 200. The diagnosis result acquisition unit 324 acquires the diagnosis result of each diagnosis target device 2 transmitted from each diagnosis unit 200 through the communication unit 310.

The display control unit 326 generates the various setting screens and displays the screens on the display. For example, the display control unit 326 generates and displays a section specifying information setting screen shown in FIG. 5 described below on the display by referring to the section specifying information list storage unit 332. Further, the display control unit 326 displays the diagnosis result acquired by the diagnosis result acquisition unit 314 on a predetermined display through the U/I unit 304.

Figure 5:
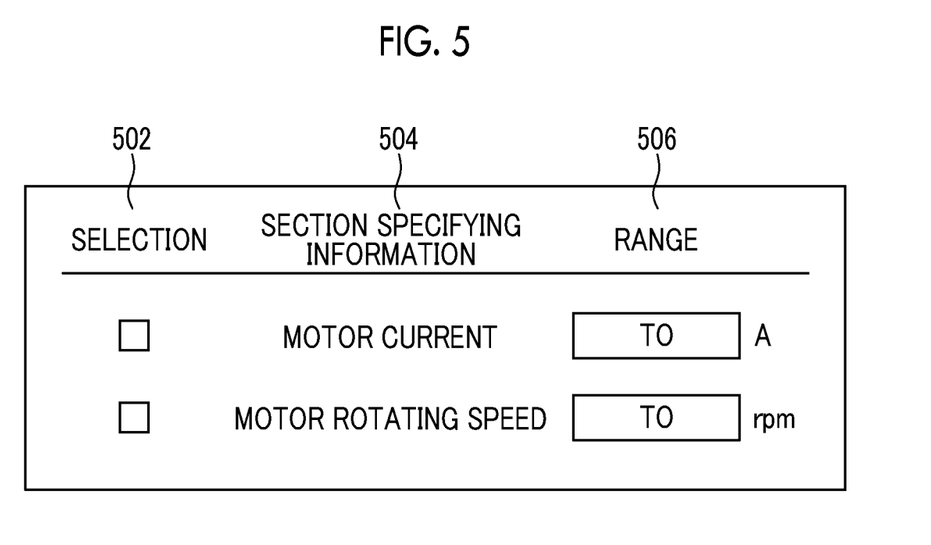
FIG. 5 is a diagram showing a section specifying information setting screen.

FIG. 5 is a diagram showing the section specifying information setting screen. In a section specifying information field 504, selectable section specifying information is displayed. In a selection field 502, checkboxes corresponding to respective pieces of section specifying information are displayed. The "motor current value" checkbox is selected in a case where the motor current value is set in the section specifying information, the "motor rotating speed" checkbox is selected in a case where the motor rotating speed is set in the section specifying information, and both the "motor current value" checkbox and the "motor rotating speed" checkbox are selected in a case where the motor current value and the motor rotating speed are set in the section specifying information. In a range field 506, a range for specifying each piece of section specifying information as the diagnosis section is set. That is, a section in which a state in which a value of the section specifying information is in the range set in the range field 506 continues for a predetermined time is specified as the diagnosis section. In the embodiment, the predetermined time is uniformly set to three seconds, for example. However, the setting of the predetermined time may be also changeable on the setting screen.

The basic configuration of the diagnosis system. 10 has been described above. Subsequently, the operation thereof will be described. The user inputs information on the section specifying information setting screen in FIG. 5. The terminal device 300 transmits the diagnosis setting information including the section specifying information input on the section specifying information setting screen in FIG. 5 to the diagnosis unit 200. The diagnosis unit 200 repeatedly executes the diagnosis processing based on various pieces of setting information including the section specifying information. Specifically, when a predetermined start instruction is received, the diagnosis unit 200 acquires the vibration information from each sensor 100 at a frequency of the set sampling frequency. The diagnosis unit 200 acquires the motor current value and the motor rotating speed from the controller of the diagnosis target device 2. The diagnosis unit 200 specifies the diagnosis section of the vibration information based on the set section specifying information. The diagnosis unit 200 diagnoses whether or not the abnormality occurs in the corresponding diagnosis target device 2 based on the vibration information of the specified diagnosis section. The diagnosis unit 200 transmits the diagnosis result to the terminal device 300. The terminal device 300 displays the diagnosis result on a predetermined display.

With the diagnosis system 10 according to the embodiment described above, the section of the vibration information suitable for the diagnosis is specified, and the diagnosis processing of the diagnosis target device 2 is executed based on the vibration information of the section. Accordingly, it is possible to diagnose the abnormality of the diagnosis target device 2 more accurately.

With the diagnosis system 10 according to the embodiment, the section of the vibration information suitable for the diagnosis is specified based on at least one of the motor current value and the motor rotating speed. Accordingly, for example, even when the load is irregularly applied to the motor of the diagnosis target device 2, it is possible to specify the section of the vibration information suitable for the diagnosis and thus to diagnose the abnormality of the diagnosis target device 2 more accurately.

With the diagnosis system 10 according to the embodiment, the section in which the state in which the section specifying information is within a predetermined range continues for a predetermined time is specified as the section of the vibration information suitable for the diagnosis. In a case where the section specifying information is within the predetermined range, that is, the variation is relatively small, the variation of the vibration information is also relatively small when there is no abnormality in the diagnosis target device 2. That is, the vibration information is relatively constant. In other words, the motor of the diagnosis target device 2 is in a relatively stable state. Therefore, it is possible to diagnose the abnormality of the diagnosis target device 2 more accurately by performing the diagnosis processing based on the vibration information of the specified diagnosis section as described above.

With the diagnosis system 10 according to the embodiment, the user can set the section specifying information. Accordingly, it is possible to execute the diagnosis processing suitable for the purpose of use of the diagnosis target device 2.

The diagnosis system according to the embodiment has been described above. The embodiments are merely examples, and those skilled in the art understand that various modification examples are possible in combinations of the constituent elements or the pieces of processing and such modification examples are within the scope of the invention. The followings are modification examples.

Modification Example 1

In the embodiment, the case where at least one of the motor current value and the motor rotating speed of the motor of the diagnosis target device 2 is used as the section specifying information is described. However, the invention is not limited thereto.

Figure 6:
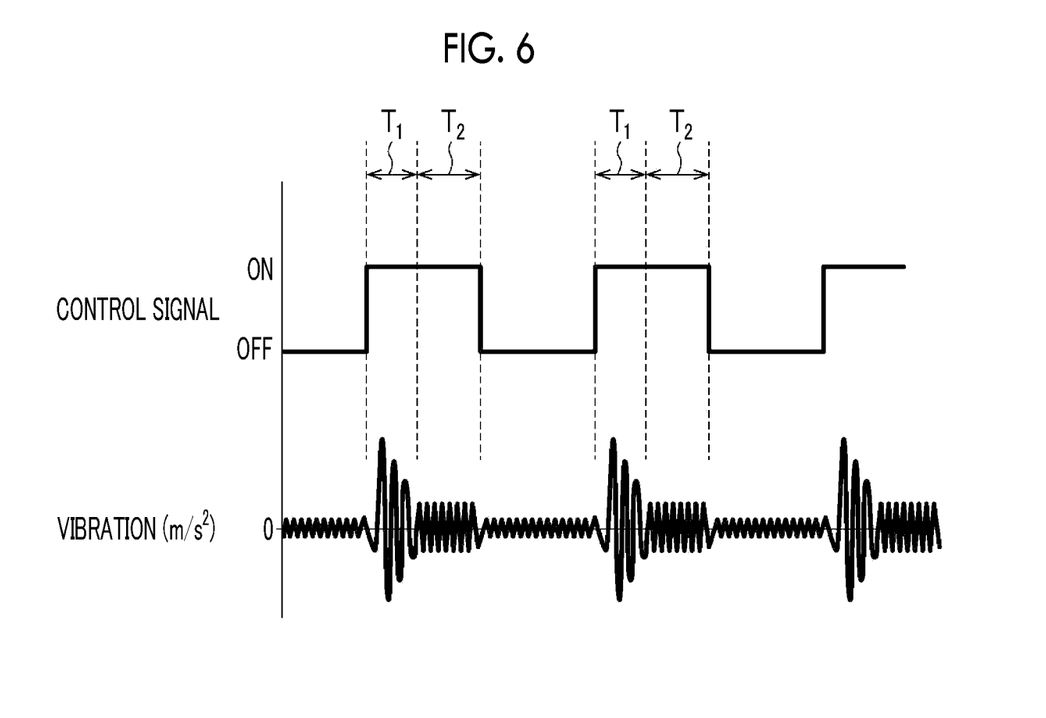
FIG. 6 is a diagram for describing a relationship between a control signal for the motor included in the diagnosis target device and vibration information generated in the diagnosis target device.

For example, a motor control signal of the diagnosis target device 2 may be used as the section specifying information. In a case where the diagnosis target device 2 is repeatedly activated and stopped in a predetermined cycle, for example, in a case where the diagnosis target device 2 is used for a lifter that carries a predetermined thing in a factory, it is possible to specify a section in which vibration information is relatively constant or a section in which a state where the vibration information is in a predetermined value range continues for a predetermined time based on the motor control signal, when a relationship between the motor control signal and the vibration information in the cycle is measured in advance. In the example of FIG. 6, the magnitude and variation of the vibration are relatively large in a first period T1 immediately after the control signal for turning on the motor is output, and the magnitude and variation of the vibration are relatively small in a subsequent second period T2. In the case, the diagnosis processing unit 224 may specify the second period T2 as the diagnosis section. According to the modification example, it is possible to obtain the same effects as in the embodiment.

For example, temperature information of the diagnosis target device 2 may be set as the section specifying information. A temperature of the diagnosis target device 2 rises for a certain period after being activated by heat generated by the motor thereof or the like. During the period, the vibration generated in the diagnosis target device 2 may vary due to the influence of the temperature rise, that is, the magnitude and variation of the vibration generated in the diagnosis target device 2 may be relatively large. Therefore, a section in which a temperature change amount of the diagnosis target device 2 within a predetermined time is within a predetermined value range (equal to or less than predetermined value) may be specified as the diagnosis section. Accordingly, it is possible to diagnose the diagnosis target device 2 more accurately since a section in which the vibration information may vary due to the influence of the temperature change is excluded from the diagnosis section. In the modification example, the diagnosis system 10 may further include a plurality of temperature sensors, and each of the plurality of temperature sensors may be attached to each diagnosis target device 2.

Figure 7:
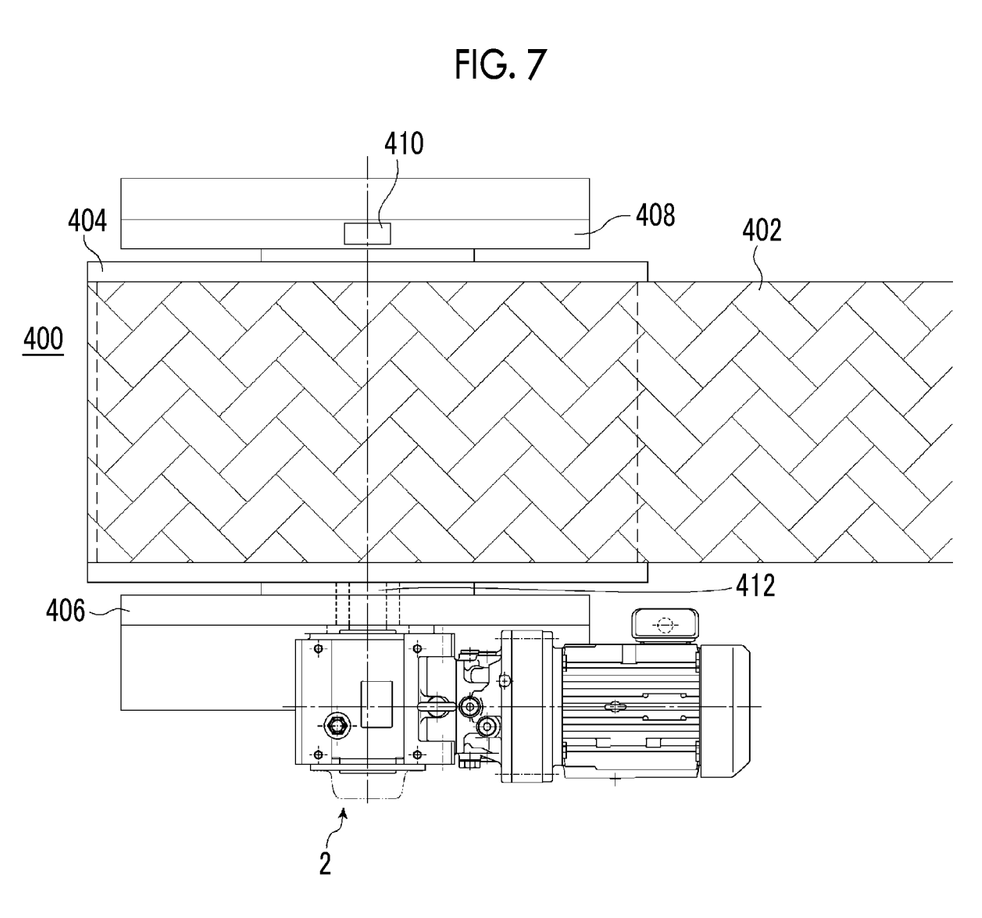
FIG. 7 is a plan view of a belt conveyor system.

For example, in a case where the diagnosis target device 2 is a gear motor that drives a conveyor system that conveys goods, information indicating that the goods are passing may be used as the section specifying information. FIG. 7 is a plan view of a belt conveyor system 400. The belt conveyor system 400 includes a conveyor belt 402, a driving roller 404, a first frame 406, a second frame 408, a driven roller (not shown), the diagnosis target device 2 that is the gear motor, and a goods detection sensor 410.

The driving roller 404 and the driven roller are disposed substantially side by side in a horizontal direction. The conveyor belt 402 is wound around these rollers. One end of each shaft of the driving roller 404 and the driven roller (shaft of the driven roller is not shown) is rotatably attached to the first frame 406 through a bearing (not shown), and the other end thereof is rotatably attached to the second frame 408 through a bearing (not shown). The first frame 406 and the second frame 408 are fixed with respect to a floor of a building where the belt conveyor system 400 is disposed. An output shaft (not shown) of the diagnosis target device 2 is attached to a shaft 412 of the driving roller 404 so as to rotate the driving roller 404.

When the goods passing on the shaft 412 of the driving roller 404 is detected, the goods detection sensor 410 generates information indicating that the goods are passing and transmits the information to the diagnosis unit 200 (not shown in FIG. 7). The acquisition unit 222 of the diagnosis unit 200 acquires the information, and the diagnosis processing unit 224 specifies a diagnosis section based on the information. For example, the diagnosis processing unit 224 may specify a section excluding a section in which the goods are passing as the diagnosis section. According to the modification example, it is possible to obtain the same effects as in the embodiment by performing the diagnosis by excluding the vibration variation due to the passing of the goods.

Modification Example 2

In the embodiments and the above modification example, the section in which the vibration information which is diagnosis target information is relatively constant is specified as the diagnosis section. However, in a case where an accurate diagnosis can be made when a section in which the vibration information is not constant (large variation) is specified as the diagnosis section, a period in which a variation in vibration information is large may be specified as the diagnosis section. In the case, it is possible to execute the diagnosis processing based on the vibration information when the load is applied to the diagnosis target device 2.

For example, when the motor current value is the section specifying information, the diagnosis processing unit 224 specifies a section in which a state where the motor current value exceeds a predetermined value continues for a predetermined time as the diagnosis section. For example, when the motor rotating speed is the section specifying information, the diagnosis processing unit 224 specifies a section in which a state where the motor rotating speed exceeds a predetermined value continues for a predetermined time as the diagnosis section. For example, when the motor current value and the motor rotating speed are the section specifying information, the diagnosis processing unit 224 may specify a section in which a state where the motor current value exceeds a predetermined current value and the motor rotating speed exceeds a predetermined rotating speed continues for a predetermined time as the diagnosis section. For example, when the motor control signal is the section specifying information, the diagnosis processing unit 224 may specify a section from an output of an ON signal with respect to the motor to t seconds as the diagnosis section in the case of FIG. 6. For example, when the information indicating that the goods are passing is the section specifying information, the diagnosis processing unit 224 may specify a section in which the goods are passing, for example, a section in which the goods detection sensor 410 in FIG. 7 detects the goods as the diagnosis section.

Modification Example 3

In the embodiments and the above modification example, the case is described in which the diagnosis system 10 diagnoses whether or not the abnormality occurs in the diagnosis target device 2 based on the vibration generated in the diagnosis target device 2 which is the gear motor. However, the invention is not limited thereto. For example, the diagnosis system 10 may diagnose whether or not the abnormality occurs in the diagnosis target device 2 based on at least one of a motor current, temperature, or iron powder concentration of lubricating oil of the diagnosis target device 2 instead of the vibration generated in the diagnosis target device 2 or in addition to the vibration generated in the diagnosis target device. That is, at least one of information on the motor current, temperature, or iron powder concentration of the lubricating oil may be used as diagnosis target information instead of the vibration information or in addition to the vibration information. The same applies when the diagnosis target device 2 is other than the gear motor. That is, the diagnosis system 10 may use the diagnosis target information suitable for determining the abnormality of the diagnosis target device.

Modification Example 4

In the embodiments and the above modification example, the case is described in which the diagnosis system 10 performs the abnormality diagnosis of the diagnosis target device 2 as the diagnosis processing. However, the diagnosis processing is not limited to the abnormality diagnosis and the diagnosis system 10 may perform the lifetime diagnosis as the diagnosis processing. In the case, for example, the diagnosis system 10 may include a sensor that detects information for specifying a stress generated in a specific part of the diagnosis target device 2, for example, weight information. The acquisition unit 222 of the diagnosis unit 200 acquires information detected by the sensor, and the diagnosis processing unit 224 specifies the stress generated in the specific part based on the acquired information. The diagnosis processing unit 224 and the diagnosis system 10 specify the stress generated in a specific part based on the information detected by the sensor and predict the lifetime of the diagnosis target device 2 by a known lifetime prediction method based on the specified stress. At this time, the diagnosis processing unit 224 may perform the lifetime prediction based on the stress of the diagnosis section specified based on the section specifying information. According to the modification example, it is possible to predict the lifetime more accurately than in the case where the lifetime is predicted based on all of the stress information. The diagnosis target information in the case of performing the lifetime diagnosis is not limited to the weight information. Any information that can diagnose the lifetime may be used, for example, vibration information may be used as in the embodiment.

Modification Example 5

In the embodiments, the case where the terminal device 300 provides the various setting screens for inputting the diagnosis setting information is described. However, the device that provides the setting screen is not particularly limited, and for example, the diagnosis unit 200 may display the setting screen.

In the embodiments, the case where the diagnosis unit 200 includes the diagnosis processing unit 224 is described. However, the device including the diagnosis processing unit 224 is not particularly limited, and for example, the terminal device 300 or another external device may include the diagnosis processing unit 224.

Any combination of the above embodiments and modification examples is also useful as an embodiment of the invention. The new embodiment generated by the combination has the effects of the combined embodiments and the modification examples.

It should be understood that the invention is not limited to the above-described embodiment, but may be modified into various forms on the basis of the spirit of the invention. Additionally, the modifications are included in the scope of the invention.

What is claimed is:

1. A diagnosis system comprising:
a sensor that is provided in a diagnosis target device and detects diagnosis target information on the diagnosis target device; and
a diagnosis processing unit that executes diagnosis processing of the diagnosis target device based on the diagnosis target information detected by the sensor,
wherein the diagnosis processing unit specifies one or a plurality of sections of diagnosis target information suitable for the diagnosis processing based on section specifying information, and executes the diagnosis processing based on the diagnosis target information in the specified section, and
wherein the diagnostic processing unit specifies a section in which a variation of the diagnostic target information is relatively small or a section in which the variation of the diagnostic target information is relatively large as the one of sections of the diagnosis target information suitable for the diagnosis processing.

2. The diagnosis system according to claim 1,
wherein the diagnosis target device is a rotation device including a motor, and
wherein the section specifying information is at least one of a motor current value or a motor rotating speed.

3. The diagnosis system according to claim 2,
wherein the diagnosis processing unit acquires at least one of the motor current value or the motor rotating speed from a controller that controls the motor.

4. The diagnosis system according to claim 1,
wherein the section specifying information is temperature information, and
wherein the diagnosis processing unit specifies a section in which a temperature change amount within a predetermined time of the diagnosis target device is equal to or less than a predetermined value as the one of the sections of the diagnosis target information suitable for the diagnosis processing.

5. The diagnosis system according to claim 1,
wherein the diagnosis processing unit specifies a section in which a state where the section specifying information is within a predetermined range continues for a predetermined time as the one of the sections of the diagnosis target information suitable for the diagnosis processing.

6. The diagnosis system according to claim 1,
wherein a type of the section specifying information and a section of the section specifying information specified as the one of the sections of the diagnosis target information suitable for the diagnosis processing are able to be set.

7. The diagnosis system according to claim 1, further comprising:
a diagnosis unit comprising the diagnosis processing unit,
wherein the diagnosis processing unit is connected to each sensor of a plurality of diagnosis target devices.

8. The diagnosis system according to claim 7, further comprising:
a terminal device to which a plurality of diagnosis units are connected,
wherein the diagnosis units transmits a result of the diagnosis processing to the terminal device, and
wherein the terminal device includes a display for displaying a diagnosis result received from the diagnosis unit.

9. The diagnosis system according to claim 8,
wherein the terminal device displays a section specifying information setting screen receiving a designation of a type of section specifying information and a range of the section specifying information from a user on the display, and
wherein the diagnosis processing unit specifies a section, in which a state where the section specifying information of the type designated by the user on the section specifying information setting screen is present in the designated range continues for a predetermined time, as the one of the sections of the diagnosis target information suitable for the diagnosis processing.

10. The diagnosis system according to claim 9,
wherein the terminal device is configured to receive a plurality of types of section specifying information and receives designations of a range of each type of the section specifying information from the user on the section specifying information setting screen, and
wherein when the designations of the plurality of types of the section specifying information and of the range of each type of the section specifying information are received from the user on the section specifying information setting screen, the diagnosis processing unit specifies a section, in which a state where an entirety of the designated section specifying information is present in the designated range continues for a predetermined time, as the one of the sections of the diagnosis target information suitable for the diagnosis processing.

11. The diagnosis system according to claim 8,
wherein the diagnosis units transmits the diagnosis result only when determination is made that an abnormality occurs.

12. The diagnosis system according to claim 1,
wherein the diagnosis processing unit specifies a longest section among a plurality of sections of diagnosis target information as the section of the diagnosis target information suitable for the diagnosis processing.

13. The diagnosis system according to claim 1,
wherein the diagnosis processing unit does not perform a diagnosis in a case where there is no section that matches a condition for the section suitable for the diagnosis processing.

14. The diagnosis system according to claim 1,
wherein the diagnosis processing unit specifies a longest section among sections that do not match a condition of the section suitable for the diagnostic processing in a case where there is no section that matches a condition for the section suitable for the diagnosis processing.

15. The diagnosis system according to claim 1,
wherein the diagnosis processing unit specifies a section in which a state where the section specifying information exceeds a predetermined value continues for a predetermined time as the one of the sections of the diagnosis target information suitable for the diagnosis processing.

16. A diagnosis system comprising:
a sensor that is provided in a diagnosis target device and detects diagnosis target information on the diagnosis target device; and
a diagnosis processing unit that executes diagnosis processing of the diagnosis target device based on the diagnosis target information detected by the sensor, wherein the diagnosis processing unit specifies one or a plurality of sections of diagnosis target information suitable for the diagnosis processing based on section specifying information, and executes the diagnosis processing based on the diagnosis target information in the specified section, wherein the diagnosis target device is a gear motor that drives a conveyor that conveys goods, and wherein the section specifying information is information indicating that the goods are passing.

17. The diagnosis system according to claim 16, wherein the diagnosis processing unit specifies a section excluding a section in which the goods are passing as the one of the sections of the diagnosis target information suitable for the diagnosis processing.

18. The diagnosis system according to claim 16, further comprising:

a goods detection sensor that detects that the goods are passing.

19. The diagnosis system according to claim 18, wherein the conveyor has a driving roller coupled with an output shaft of the gear motor, and wherein the goods detection sensor detects the goods passing on the driving roller.

\* \* \* \* \*